(12) United States Patent
Yoshizaki

(10) Patent No.: US 11,368,638 B2
(45) Date of Patent: Jun. 21, 2022

(54) IMAGING ELEMENT, IMAGING DEVICE, IMAGING METHOD AND COMPUTER-READABLE RECORDING MEDIUM

(71) Applicant: OLYMPUS CORPORATION, Tokyo (JP)

(72) Inventor: Kazunori Yoshizaki, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/181,022

(22) Filed: Feb. 22, 2021

(65) Prior Publication Data

US 2021/0185248 A1 Jun. 17, 2021

Related U.S. Application Data

(63) Continuation of application No. PCT/JP2018/034679, filed on Sep. 19, 2018.

(51) Int. Cl.
*H04N 5/33* (2006.01)
*H04N 9/04* (2006.01)

(52) U.S. Cl.
CPC .......... *H04N 5/332* (2013.01); *H04N 9/0455* (2018.08)

(58) Field of Classification Search
CPC ... H04N 5/332; H04N 9/0455; H04N 9/04553
USPC ........................................................ 348/164
See application file for complete search history.

(56) References Cited

U.S. PATENT DOCUMENTS

2007/0126894 A1* 6/2007 Stroker ............. H04N 9/04515
348/242
2008/0278592 A1 11/2008 Kuno et al.

FOREIGN PATENT DOCUMENTS

| JP | 2002142228 A | * | 5/2002 |
| JP | 2005-006066 A | | 1/2005 |
| JP | 2005-341467 A | | 12/2005 |
| JP | 2005341467 A | * | 12/2005 |
| JP | 2006-13567 A | | 1/2006 |
| JP | 2006-94112 A | | 4/2006 |

(Continued)

OTHER PUBLICATIONS

International Search Report dated Dec. 11, 2018 issued in PCT/JP2018/034679.

*Primary Examiner* — Kathleen M Walsh
(74) *Attorney, Agent, or Firm* — Scully, Scott, Murphy & Presser, P.C.

(57) ABSTRACT

An imaging element includes: a pixel portion in which a plurality of pixels are disposed in a two-dimensional matrix; and a color filter including a plurality of filters that have different spectral transmission characteristics from each other in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics from each other in a same color wavelength band, have a region with a constant spectral transmittance in each of the visible region and the near-infrared region, and have different spectral transmittances from each other in at least one of the visible region and the near-infrared region.

5 Claims, 10 Drawing Sheets

(56) References Cited

FOREIGN PATENT DOCUMENTS

JP 2017-139286 A 8/2017
JP 2017139286 A * 8/2017 ............... G02B 5/20

* cited by examiner

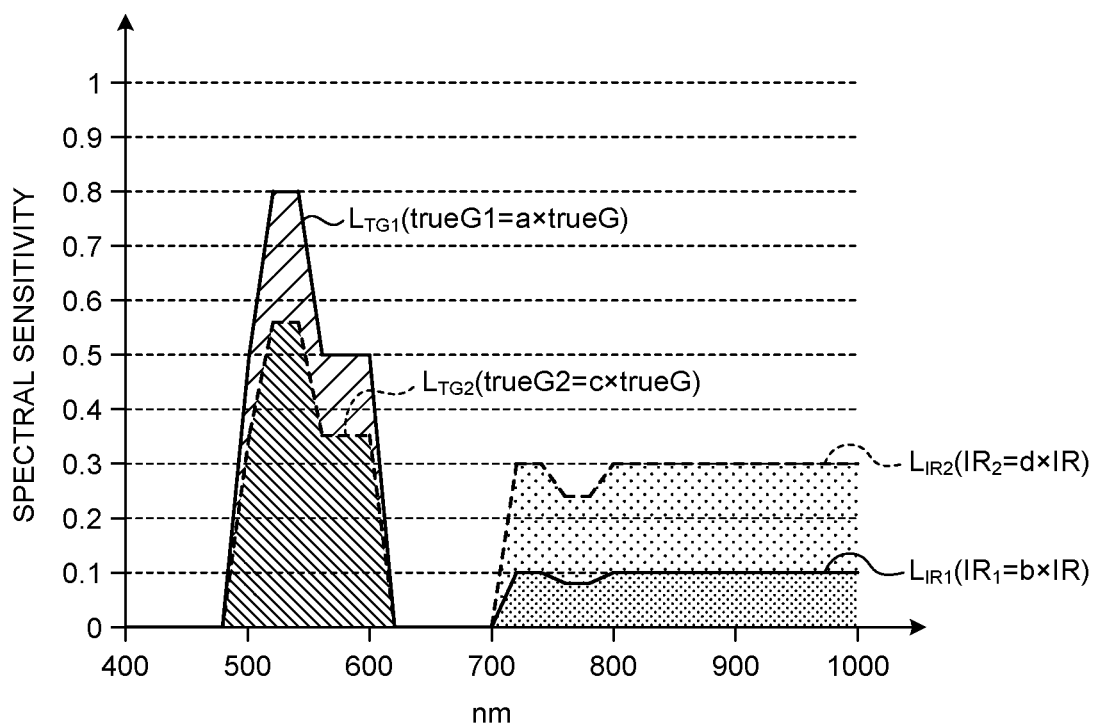

IMAGING ELEMENT, IMAGING DEVICE, IMAGING METHOD AND COMPUTER-READABLE RECORDING MEDIUM

CROSS-REFERENCE TO RELATED APPLICATION

This application is a continuation of International Application No. PCT/JP2018/034679, filed on Sep. 19, 2018, the entire contents of which are incorporated herein by reference.

BACKGROUND

1. Technical Field

The present disclosure relates to an imaging element, an imaging device, an imaging method, and a computer-readable recording medium that are capable of capturing a color image and a near-infrared image.

2. Related Art

In the related art, in an imaging device, a technique capable of capturing a color image and a near-infrared image has been known (see, JP 2005-6066 A). With this technique, by replacing one filter with an IR filter of a Bayer array consisting of an R filter, two G filters and a B filter, a visible light image and a near-infrared image are captured.

In addition, in the color filter composed of the R filter, the G filter, the B filter and the IR filter, a technique for capturing a color image and a near-infrared image by providing an infrared absorption filter on the light receiving faces of the R filter, the G filter and the B filter is known (see, JP 2017-139286 A).

SUMMARY

In some embodiments, an imaging element includes: a pixel portion in which a plurality of pixels are disposed in a two-dimensional matrix, each pixel being configured to generate an image signal by receiving light; and a color filter including a plurality of filters that have different spectral transmission characteristics from each other in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics from each other in a same color wavelength band, have a region with a constant spectral transmittance in each of the visible region and the near-infrared region, and have different spectral transmittances from each other in at least one of the visible region and the near-infrared region.

In some embodiments, an imaging device includes: an imaging element including a pixel portion in which a plurality of pixels are disposed in a two-dimensional matrix, each pixel being configured to generate an image signal by receiving light, and a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region; and a separator configured to separate an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

In some embodiments, provided is an imaging method performed by an imaging device. The imaging device includes an imaging element and an image processor, the imaging element including a pixel portion in which a plurality of pixels are disposed in a two-dimensional matrix, each pixel being configured to generate an image signal by receiving light, and a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region. The method includes: separating, by the image processor, an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

In some embodiments, provided is a non-transitory computer-readable recording medium with an executable program stored thereon. The program is executed by an imaging device including an imaging element and an image processor, the imaging element including a pixel portion in which a plurality of pixels are disposed in a two-dimensional matrix, each pixel being configured to generate an image signal by receiving light, and a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region. The program causes the imaging device to execute: separating, by the image processor, an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 10 illustrates the spectral sensitivity of each of a $G_1$ pixel and a $G_2$ pixel according to the first embodiment;

FIG. 11 is a diagram schematically illustrating a configuration of a color filter according to a first modification of the first embodiment;

DETAILED DESCRIPTION

Figure 1:
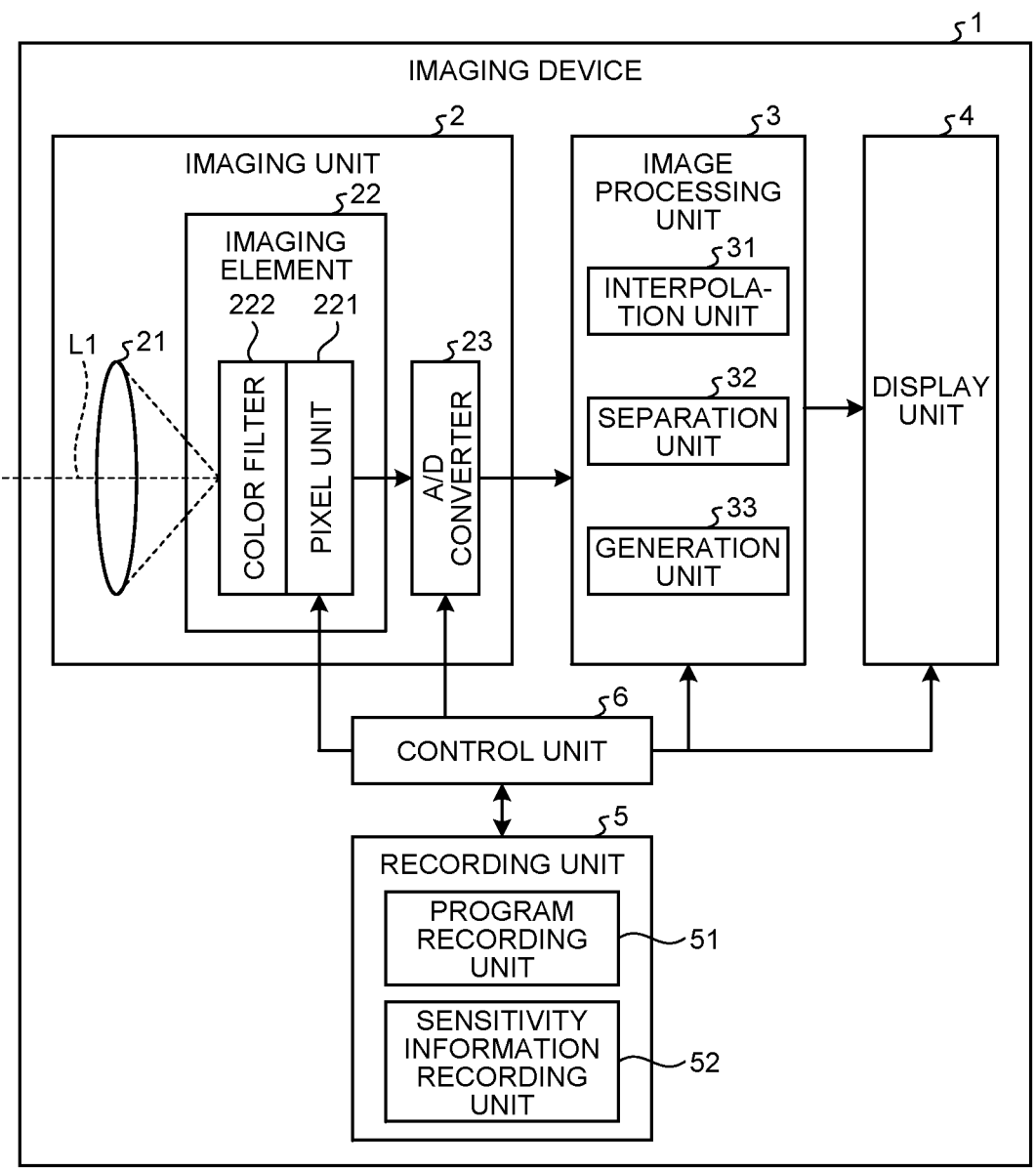
FIG. 1 is a block diagram illustrating a functional configuration of an imaging device according to a first embodiment.

Hereinafter, a mode for carrying out the present disclosure (hereinafter referred to as an "embodiment") will be described. In the embodiment, an imaging device including an imaging element that generates image data (RAW data) by capturing a subject will be described. Moreover, the embodiment does not limit the present disclosure. Further, in the description of the drawings, the same parts will be described with the same reference numerals.

First Embodiment

Configuration of Imaging Device

FIG. 1 is a block diagram illustrating a functional configuration of an imaging device according to a first embodiment. The imaging device 1 illustrated in FIG. 1 includes an imaging unit 2, an image processing unit (image processor) 3, a display unit 4, a recording unit 5, and a control unit 6.

The imaging unit 2 generates image data by capturing a subject. The imaging unit 2 includes an optical system 21, an imaging element 22, and an A/D converter 23.

The optical system 21 forms a subject image on the light receiving face of the imaging element 22. The optical system 21 includes one or a plurality of lenses. The optical system 21 has a zoom function and a focus function. The optical system 21 changes the zoom magnification and the focus position by moving on an optical axis L1 by a drive unit such as a motor (not illustrated).

The light receiving face of the imaging element 22 is provided perpendicular to the optical axis L1 of the optical system 21. The imaging element 22 generates under the control of the control unit 6 an image signal (image data) by performing photoelectric conversion on the subject image formed by the optical system 21 to output this image signal to the A/D converter 23. The imaging element 22 is realized by using a charge coupled device (CCD), a complementary metal oxide semiconductor (CMOS), or the like. The imaging element 22 includes a pixel unit (pixel portion) 221 and a color filter 222 laminated on the light receiving face of the pixel unit 221. The detailed configuration of the pixel unit 221 and the color filter 222 will be described later.

Under the control of the control unit 6, the A/D converter 23 performs an A/D conversion on an analog image signal input from the imaging unit 2 to output the image signal to the image processing unit 3. The A/D converter 23 includes, for example, an A/D conversion circuit and the like.

The image processing unit 3 performs, under the control of the control unit 6, various image processes, for example, a white balance adjustment process, a demosaicing process, a separation process, and the like on the image signal input from the imaging unit 2 to output the processed image signal to the display unit 4. The image processing unit 3 includes a dedicated processor such as various arithmetic circuits, such as a graphics processing unit (GPU) or an application specific integrated circuit (ASIC), or a field programmable gate array (FPGA), that execute a specific function. The image processing unit 3 includes an interpolation unit 31, a separation unit (separator) 32, and a generation unit 33.

The interpolation unit 31 performs a well-known interpolation process for interpolating the image signal (pixel value) of each pixel with respect to the image signal input from the imaging unit 2. Specifically, the interpolation unit 31 performs a well-known interpolation process on the image signal of each filter constituting the color filter 222 to generate an image corresponding to the image signal, of each filter, that interpolates the image signal of each filter.

The separation unit 32 separates the image signal in the visible region and the image signal in the near-infrared region from each of the first image signal generated by the pixel on which the first same-color filter is disposed and the second image signal generated by the pixel on which the second same-color filter is disposed based on the first ratio between the transmittance of the first same-color filter and the transmittance of the second same-color filter in the visible region, and the second ratio between the transmittance of the first same-color filter and the transmittance of the second same-color filter in the near-infrared region. The details of the separation method by the separation unit 32 will be described later.

The generation unit 33 generates a visible light image and a near-infrared image (hereinafter, simply referred to as an "IR image") based on the image signal in the visible region and the image signal in the near-infrared region separated by the separation unit 32. The generation unit 33 outputs the visible light image and the IR image to the display unit 4.

Under the control of the control unit 6, the display unit 4 displays an image (at least one of the visible light image and the IR image) corresponding to the image signal input from the image processing unit 3. In addition, the display unit 4 displays various pieces of information related to the imaging device 1. The display unit 4 includes a display panel such as a liquid crystal or an organic electro luminescence (EL).

The recording unit 5 records a program executed by the imaging device 1, data being processed, image data generated by the imaging unit 2, and the like. The recording unit 5 includes a program recording unit 51 that records a program executed by the imaging device 1, and a sensitivity information recording unit 52 that records the sensitivity of each filter of the color filter 222. The recording unit 5 includes, for example, a Flash memory, a random access memory (RAM), a hard disk drive (HDD), a synchronous dynamic random access memory (SDRAM), a memory card, or the like.

The control unit 6 controls each unit of the imaging device 1. The control unit 6 includes a central processing unit (CPU) and the like.

Configuration of Pixel Unit

Figure 2:
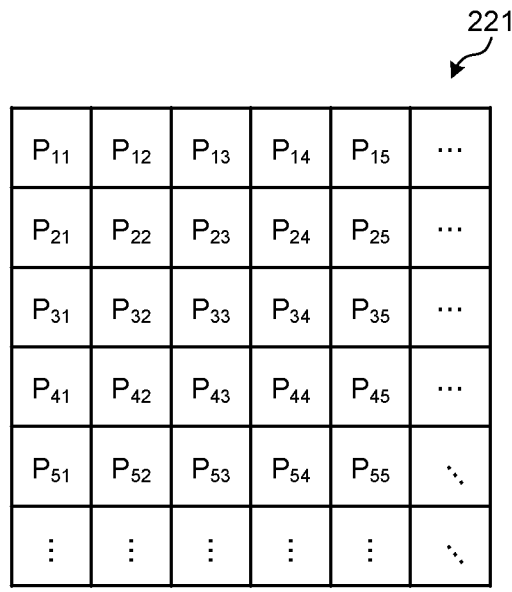
FIG. 2 is a diagram schematically illustrating a configuration of a pixel unit according to the first embodiment.

Next, the detailed configuration of the pixel unit 221 described above will be described. FIG. 2 is a diagram schematically illustrating the configuration of the pixel unit 221.

The pixel unit 221 illustrated in FIG. 2 is formed by arranging a plurality of pixels P that receives light transmitted through the color filter 222 in a two-dimensional grid pattern (two-dimensional matrix pattern). Each pixel P receives light which is incident from the optical system 21, and that is transmitted through the color filter 222 to perform a photoelectric conversion to generate an image signal. This image signal includes a pixel value (luminance value) of each pixel, pixel position information (pixel address), and the like. In FIG. 2, the pixel disposed in the i-th row and the j-th column is expressed as a pixel $P_{ij}$.

Configuration of Color Filter

Figure 3:
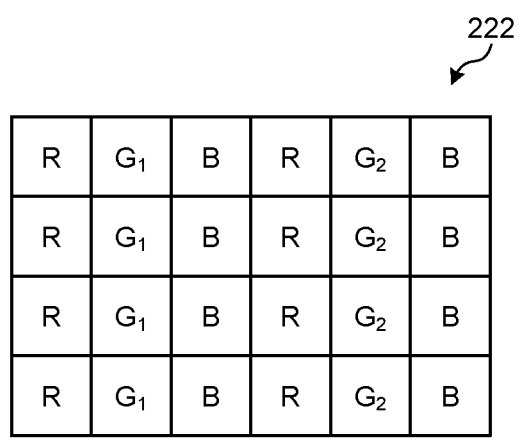
FIG. 3 is a diagram schematically illustrating a configuration of a color filter according to the first embodiment.

Next, the detailed configuration of the color filter 222 will be described. FIG. 3 is a diagram schematically illustrating the configuration of the color filter 222.

The color filter 222 illustrated in FIG. 3 is disposed so that a filter unit composed of a plurality of filters having different spectral transmission characteristics in each of the visible region and the near-infrared region correspond to a plurality of pixels of the pixel unit 221. Specifically, the color filter 222 is disposed on the light receiving face of the pixel unit 221, and includes four types of filters that transmit the visible light in different wavelength bands in the visible region and the near-infrared rays in different wavelength bands in the near-infrared region. More specifically, the color filter 222 includes an R filter, a $G_1$ filter, a $G_2$ filter, and a B filter. The color filter 222 is formed by arranging the R filters, the $G_1$ filters, the $G_2$ filters, and the B filters side by side in a predetermined array pattern. Specifically, the color filter 222 is formed by arranging an R filter column, a $G_1$ filter column, a B filter column, an R filter column, and a $G_2$ filter column in an array pattern.

The R filter transmits light in the red wavelength band. The $G_1$ filter transmits light in the green wavelength band and transmits light in the near-infrared wavelength band. The $G_2$ filter has different transmission wavelength characteristics than the $G_1$ filter in the same color wavelength band as the $G_1$ filter, transmits light in the green wavelength band, and transmits light in the near-infrared wavelength band. The B filter transmits light in the blue wavelength band.

The $G_1$ filter and the $G_2$ filter have a region with a constant spectral transmittance in each of the visible region and near-infrared region, and have different spectral transmittances from each other in at least one of the visible region and the near-infrared region. In the first embodiment, the $G_1$ filter and the $G_2$ filter function as a first same-color filter and a second same-color filter, respectively. Further, in the following, the pixel $P_{ij}$ on which each filter is provided receives light in the wavelength band transmitted through the filter. Therefore, the pixel on which the R filter is disposed is referred to as an R pixel, the pixel on which the $G_1$ filter is disposed is referred to as a $G_1$ pixel, the pixel on which the $G_2$ filter is disposed is referred to as a $G_2$ pixel, and the pixel on which the B filter is disposed is referred to as a B pixel.

Spectral Transmission Characteristics of Each Filter

Figure 4:
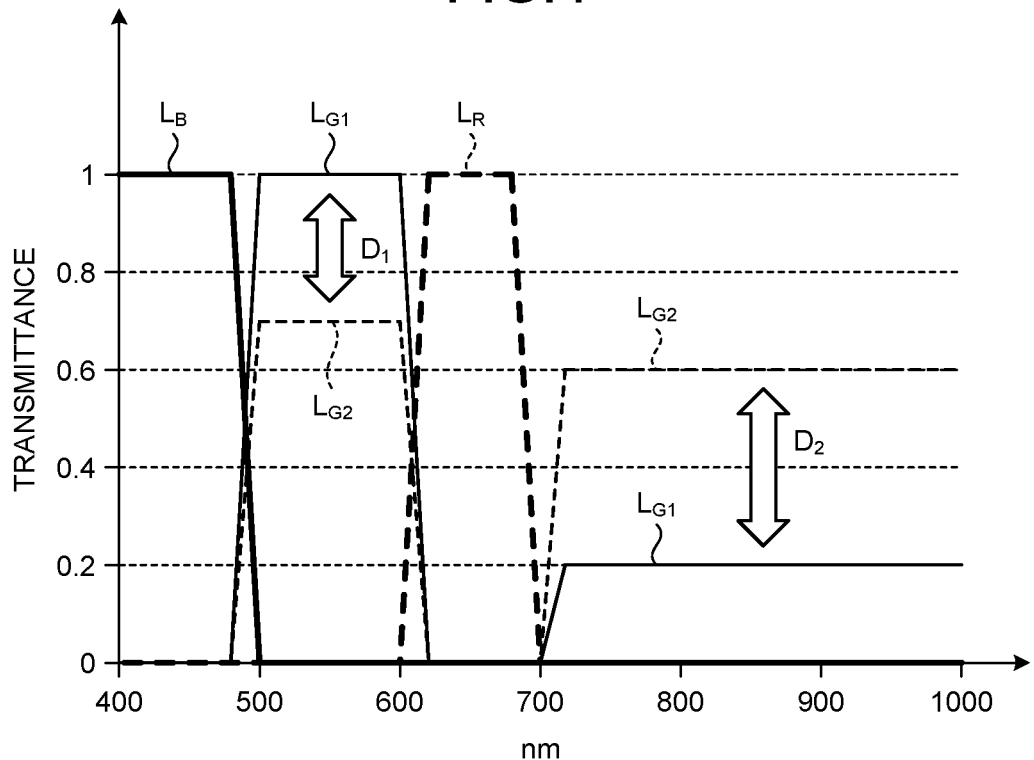
FIG. 4 is a diagram illustrating the transmission characteristics of each filter according to the first embodiment.

Next, the transmission characteristics (spectral sensitivity characteristics) of the color filter 222 described above will be described. FIG. 4 is a diagram illustrating the transmission characteristics of each filter. In FIG. 4, the vertical axis represents the transmittance (spectral sensitivity) and the horizontal axis represents the wavelength (nm). Furthermore, in FIG. 4, the curve $L_B$ indicates the transmittance curve of filter B, the curve $L_{G1}$ indicates the transmission curve of filter $G_1$, the curve $L_{G2}$ indicates the transmission curve of filter $G_2$, and the curve $L_R$ indicates the transmission curve of the filter R. Further, in the following, the visible region ranges from 400 nm to 700 nm, and the near-infrared region ranges from 700 nm to 1000 nm.

As illustrated in the curve $L_R$ illustrated in FIG. 4, the filter R transmits light in the red wavelength band (wavelength band 600 nm to 700 nm), which is the first visible region. Further, as illustrated in the curve $L_B$, the filter B transmits light in the blue wavelength band (400 nm to 500 nm), which is the second visible region. Also, as illustrated in the curve $L_{G1}$ and the curve $L_{G2}$, the filter $G_1$ and the filter $G_2$ transmit light in the green wavelength band (500 nm to 600 nm), which is the third visible band, and the near-infrared region (700 nm to 1000 nm). Further, the filter $G_1$ and the filter $G_2$ have a region having a constant spectral transmittance in each of the third visible light region and the near-infrared region. Furthermore, the filter $G_1$ and the filter $G_2$ have different transmittances from each other in each of the third visible light region and the near-infrared region, and the difference $D_1$ between the transmittance of the filter $G_1$ and the transmittance of the filter $G_2$ in the third visible light region, and the difference $D_2$ between the transmittances of the filter $G_1$ and the transmittance of the filter $G_2$ in the near-infrared region are each constant. In the first embodiment, the filter $G_1$ and the filter $G_2$ have different transmittances from each other in each of the third visible light region and the near-infrared region, but the filter $G_1$ and the filter $G_2$ may have different transmittances from each other in at least one of the third visible light region and the near-infrared region.

Processing of Imaging Device

Figure 5:
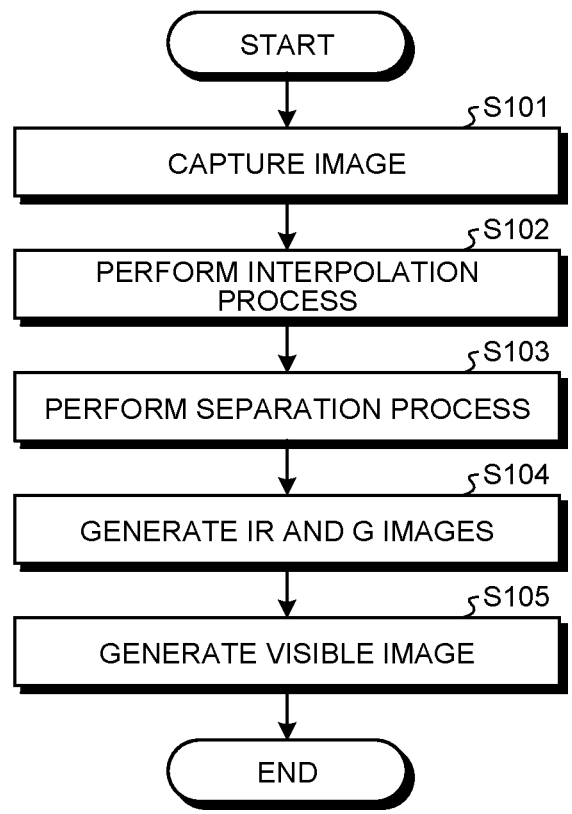
FIG. 5 is a flowchart illustrating an outline of a process executed by the imaging device according to the first embodiment.
Figure 6:
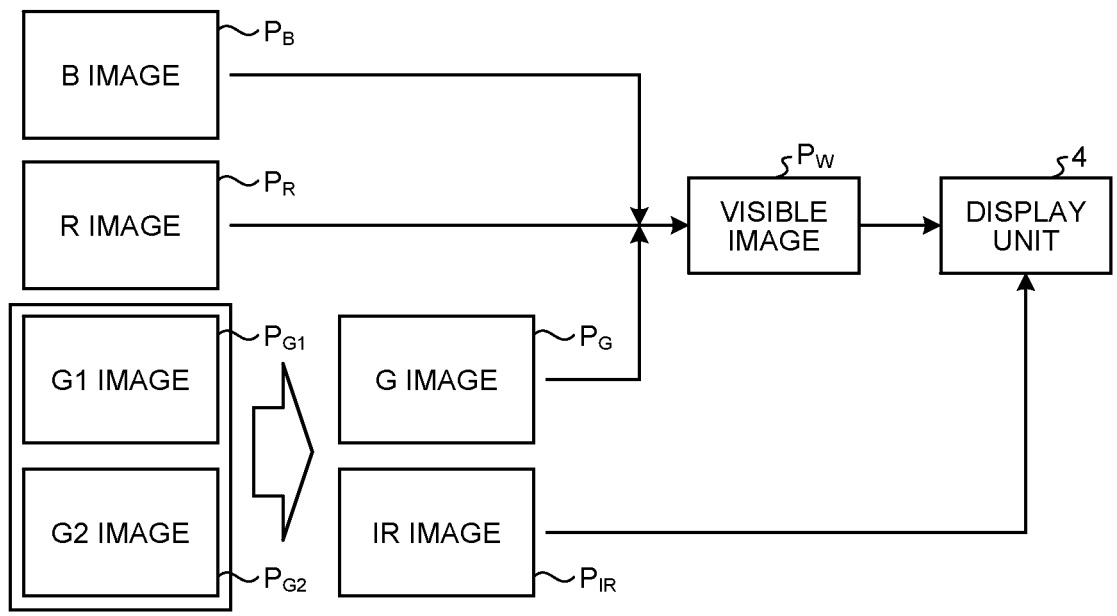
FIG. 6 is a diagram schematically illustrating an example of an image generated by the imaging device according to the first embodiment.

Next, the process executed by the imaging device 1 will be described. FIG. 5 is a flowchart illustrating an outline of the process executed by the imaging device 1. FIG. 6 is a diagram schematically illustrating an example of an image generated by the imaging device 1.

As illustrated in FIG. 5, first, the imaging unit 2 images a subject (step S101). In this case, the imaging unit 2 outputs an image signal obtained by imaging the subject to the image processing unit 3.

Subsequently, the interpolation unit 31 performs an interpolation process for interpolating the pixel value of each pixel with respect to the image signal input from the imaging unit 2 (step S102). Specifically, as illustrated in FIG. 6, the interpolation unit 31 performs the interpolation process for interpolating the image signal of each pixel with respect to the image signal input from the imaging unit 2 to generate a B image $P_B$, an R image $P_R$, a $G_1$ image $P_{G1}$, and a $G_2$ image $P_{G2}$.

After that, the separation unit 32 executes a separation process for separating the image signal in the visible region and the image signal in the near-infrared region with respect to the $G_1$ image $P_{G1}$ and the $G_2$ image $P_{G2}$ (step S103).

Details of Separation Process

Here, an outline of the separation process executed by the separation unit 32 will be described.

Figure 7:
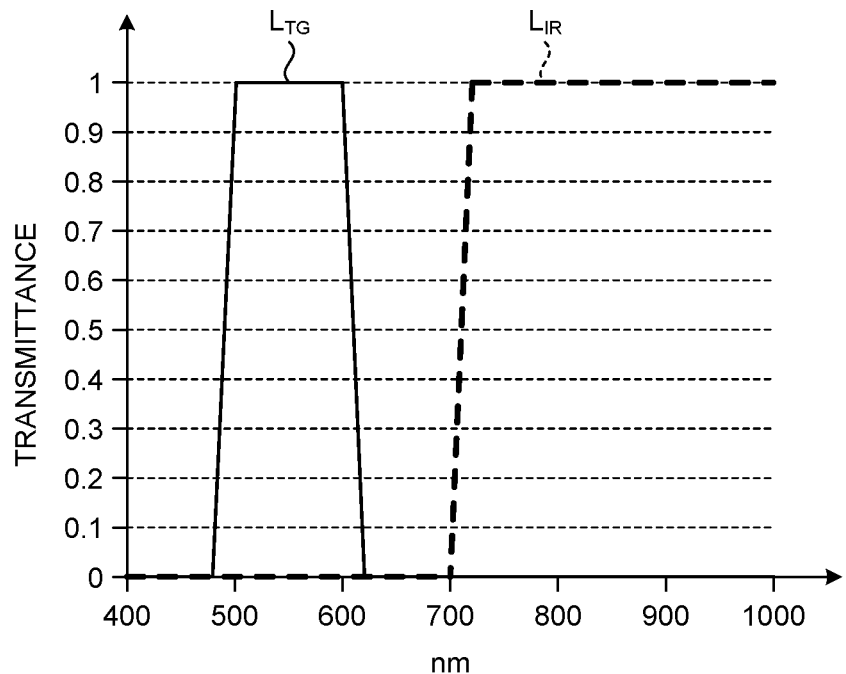
FIG. 7 is a diagram schematically illustrating the spectral transmittance of each of trueG and IR according to the first embodiment.
Figure 8:
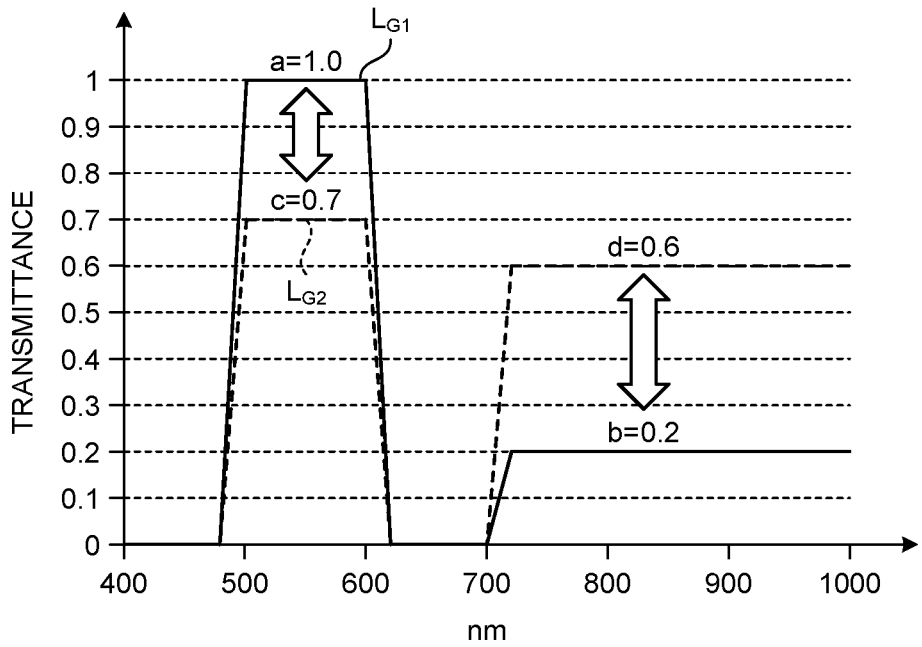
FIG. 8 is a diagram schematically illustrating the transmittance of each of a filter $G_1$ and a filter $G_2$ according to the first embodiment.

FIG. 7 is a diagram schematically illustrating the spectral transmittance in each of the trueG and the IR. In FIG. 7, the vertical axis represents the transmittance and the horizontal axis represents the wavelength (nm). Further, in FIG. 7, the curve $L_{TG}$ indicates the transmittance in the trueG, and the curve $L_{IR}$ indicates the transmittance in the IR. Further, FIG. 8 is a diagram schematically illustrating the transmittance of each of the filter $G_1$ and the filter $G_2$. In FIG. 8, the curve $L_{G1}$ indicates the transmittance of the filter $G_1$, and the curve $L_{G2}$ indicates the transmittance of the filter $G_2$.

As illustrated in FIG. 7, in the first embodiment, in a case where the transmittance in each of the trueG (500 nm to 600 nm) and the IR (700 nm to 1000 nm) is set to "1.0", when the transmittance in each wavelength band is a, b, c and d, as illustrated in FIG. 8, the transmission ratios between the filter $G_1$ and the filter $G_2$ in the trueG (500 nm to 600 nm) is constant and known (a=1.0, c=0.7), and the transmission ratios between the filter $G_1$ and the filter $G_2$ in the IR (700 nm to 1000 nm) are constant and known (b=0.2, d=0.6).

Figure 9:
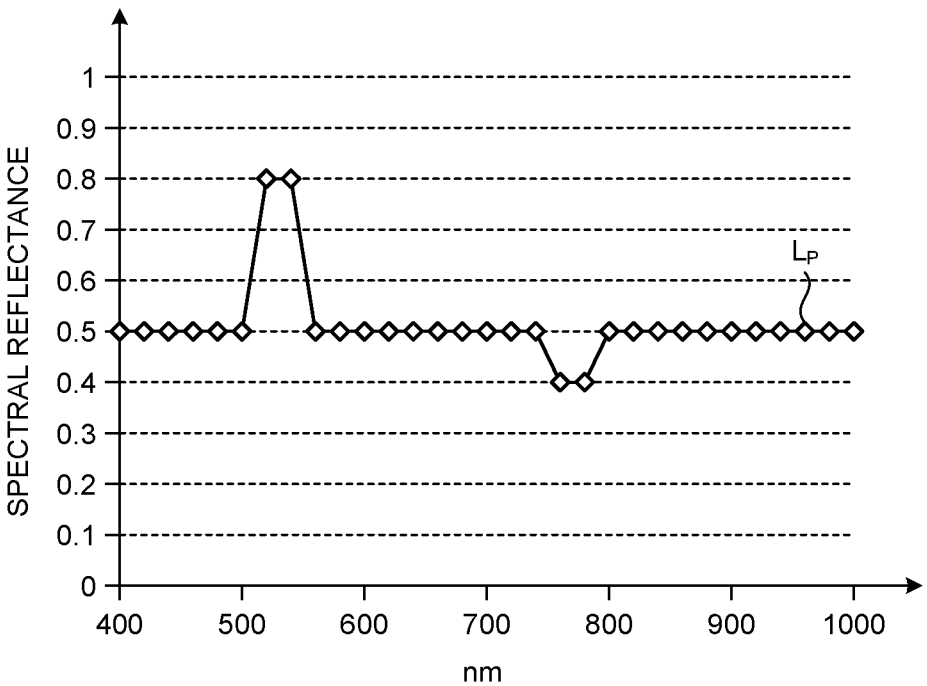
FIG. 9 is a diagram schematically illustrating the spectral reflectance of a subject.

FIG. 9 is a diagram schematically illustrating the spectral reflectance of the subject. FIG. 10 illustrates the spectral sensitivities of the $G_1$ pixel and the $G_2$ pixel. In FIG. 9, the vertical axis represents the spectral reflectance. In FIG. 10, the vertical axis represents the spectral sensitivity, and in FIGS. 9 and 10, the horizontal axis represents the wavelength (nm). Further, in FIG. 9, the curve $L_p$ indicates the spectral reflectance of the subject. Also, in FIG. 10, the area surrounded by the curve $L_{TG1}$ indicates truerG1 (a×truerG), the area surrounded by the curve $L_{TG2}$ indicates truerG2 (c×truerG), the area surrounded by the curve $L_{TR2}$ indicates IR2 (d×IR), and the area surrounded by the curve $L_{IR1}$ indicates IR1 (b×IR).

As illustrated in FIGS. 9 and 10, the separation unit 32 separates the image signal in the visible region and the image signal in the near-infrared region from each of the first image signal generated by the $G_1$ pixel and the second image signal generated by the $G_2$ pixel based on the first ratio $D_1$ (a/c) of the transmittance of the $G_1$ filter to the transmittance of the $G_2$ filter in the visible region and the second ratio $D_2$ (d/b) of the transmittance of the $G_1$ filter to the transmittance of the $G_2$ filter in the near-infrared region.

That is, when in the $G_1$ image $P_{G1}$, the image signal of the $G_1$ image $P_{G1}$ only in the visible region is trueG$_1$, the image signal only in the near-infrared region is IR1, the image signal of the true $G_1$ image $P_{G1}$ only in the visible region is trueG, and the true image signal only in the near-infrared region is IR, and in the $G_2$ image $P_{G2}$, the image signal of the true $G_2$ image $P_{G2}$ only in the visible region is trueG$_2$, the true image signal only in the near-infrared region is IR2, the image signal of the true $G_2$ image $P_{G2}$ only in the visible region is trueG, and the true image signal only in the near-infrared region is IR, the following equations (1) and (2) hold.

$$\text{true}G_1 + IR1 = a \times \text{true}G + b \times IR = G1 \quad (1)$$

$$\text{true}G_2 + IR2 = c \times \text{true}G + d \times IR = G2 \quad (2)$$

when solving the equations (1) and (2) above, and assuming that $\alpha = ad - bc$ holds, and $ad - bc \neq 0$ holds, resulting in the following:

$$IR = (a \times G2 - c \times G1)/\alpha \quad (3)$$

$$\text{true}G = (d \times G1 - b \times G2)/\alpha \quad (4)$$

Further, when a (a=1.0), b (b=0.2), c (c=0.7) and d (d=0.6) in FIG. 8 are substituted into the above equations (1) and (2), the following equations (5) and (6) hold.

$$\begin{aligned}\text{true}G1 + IR1 &= a \times \text{true}G + b \times IR \\ &= 1.0 \times \text{true}G + 0.2 \times IR \\ &= G1\end{aligned} \quad (5)$$

$$\begin{aligned}\text{true}G2 + IR2 &= c \times \text{true}G + d \times IR \\ &= 0.7 \times \text{true}G + 0.6 \times IR \\ &= G2\end{aligned} \quad (6)$$

In this way, using equations (3) to (6), the separation unit 32 separates the image signal in the visible region and the image signal in the near-infrared region from each of the first image signal generated by the $G_1$ pixel and the second image signal generated by the $G_2$ pixel based on the first ratio $D_1$ (a/c) of the transmittance of the $G_1$ filter to the transmittance of the $G_2$ filter in the visible region and the second ratio $D_2$ (d/b) of the transmittance of the $G_1$ filter to the transmittance of the $G_2$ filter in the near-infrared region.

Returning to FIG. 5, the description after step S103 is continued.

Subsequently, the generation unit 33 generates an IR image and a G image based on the signal value in the visible region and the signal value in the near-infrared region separated by the separation unit 32. Specifically, as illustrated in FIG. 6, the generation unit 33 generates the G image $P_G$ and the IR image $P_{IR}$ based on the signal value in the visible region and the signal value in the near-infrared region separated by the separation unit 32 (step S104).

After that, the generation unit 33 generates a visible image (step S105). Specifically, as illustrated in FIG. 6, the generation unit 33 generates the visible image $P_W$ based on the B image $P_B$, the R image $P_R$, and the G image $P_G$. After step S105, the imaging device 1 ends this process.

According to the first embodiment described above, the color filter 222 includes the first same-color filter and the second same-color filter in which any one or more of the plurality of filters transmit light in a near-infrared region, the first same-color filter and the second same-color filter having different transmission wavelength characteristics in the same color wavelength band, and the first same-color filter and the second same-color filter have a region with a constant spectral transmittance in each of the visible region and the near-infrared region and have different spectral transmittances in at least one of the visible region and the near-infrared region, so that a color image and a near-infrared image can be acquired at the same time without installing an IR filter.

Further, according to the first embodiment, the separation unit 32 separates the image signal in the visible region and the image signal in the near-infrared region from each of the first image signal generated by the pixel on which the first same-color filter is disposed and the second image signal generated by the pixel on which the second same-color filter is disposed based on the first ratio of the transmittance of the first same-color filter to the transmittance of the second same-color filter in the visible region, and the second ratio of the transmittance of the first same-color filter to the transmittance of the second same-color filter in the near-infrared region, so that a color image and a near-infrared image can be acquired at the same time without installing an IR filter.

First Modification of First Embodiment

Next, a first modification of the first embodiment will be described. In the first modification of the first embodiment, the configuration of the color filter is different. Specifically, in the first embodiment described above, the G filters that transmit light in the green wavelength band have different spectral transmission characteristics, but in the first modification of the first embodiment, R filters that transmit light in the red wavelength band have different spectral transmission characteristics. The same components as those of the imaging device 1 according to the first embodiment described above are given the same reference numerals, and detailed description thereof will be omitted.

Configuration of Color Filter

FIG. 11 describes a detailed configuration of the color filter according to the first modification of the first embodiment.

A color filter 222A illustrated in FIG. 11 is disposed so that a filter unit composed of a plurality of filters having different spectral transmission characteristics in each of the visible region and the near-infrared region correspond to a plurality of pixels of the pixel unit 221. Specifically, the color filter 222A is disposed on the light receiving face of the pixel unit 221, and includes four types of filters that transmit the visible light in different wavelength bands in the visible region and the near-infrared rays in different wavelength bands in the near-infrared region. More specifically, the color filter 222 includes an $R_1$ filter, an $R_2$ filter, a G filter, and a B filter. The color filter 222A is formed by arranging the $R_1$ filters, the $R_2$ filters, the G filters, and the B filters side by side in a predetermined array pattern. Specifically, the color filter 222A is formed by arranging an $R_1$ filter column, a G filter column, a B filter column, and an $R_2$ filter column in an array pattern.

The $R_1$ filter transmits light in the red wavelength band and transmits light in the near-infrared wavelength band. The $R_2$ filter has different transmission wavelength characteristics than the $R_1$ filter in the same color wavelength band as the $R_1$ filter, transmits light in the red wavelength band, and transmits light in the near-infrared wavelength band.

The $R_1$ filter and the $R_2$ filter have a region with a constant spectral transmittance in each of the visible region and the near-infrared region, and have different spectral transmittances in at least one of the visible region and the near-infrared region. In the first modification of the first embodiment, the $R_1$ filter and the $R_2$ filter function as the first same-color filter and the second same-color filter, respectively. Further, in the following, the pixel $P_{ij}$ on which each filter is provided receives light in the wavelength band transmitted through the filter. Therefore, the pixel on which the $R_1$ filter is disposed is referred to as an $R_1$ pixel, the pixel on which the $R_2$ filter is disposed is referred to as an $R_2$ pixel, the pixel on which the G filter is disposed is referred to as a G pixel, and the pixel on which the B filter is disposed is referred to as a B pixel.

Figure 12:
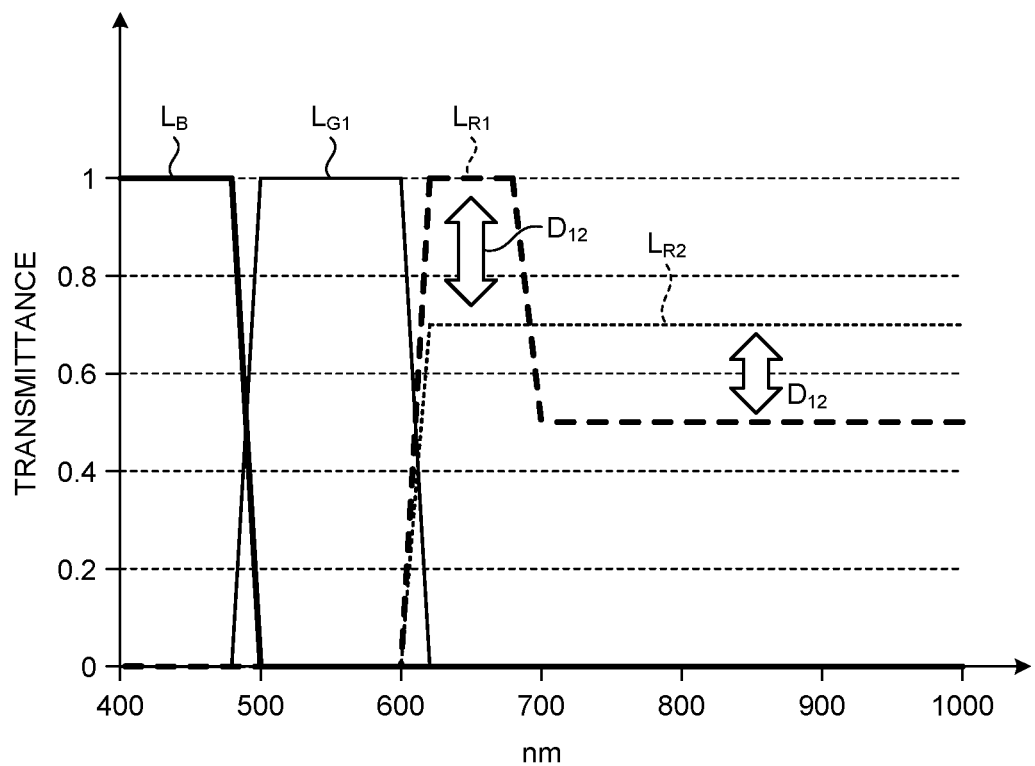
FIG. 12 is a diagram illustrating the transmission characteristics of the color filter according to the first modification of the first embodiment.

FIG. 12 is a diagram illustrating the transmission characteristics of the color filter according to the first modification of the first embodiment. In FIG. 12, the transmission curve is simulated and standardized so that the maximum values of the filters are substantially equal. In FIG. 12, the vertical axis represents the transmittance (spectral sensitivity) and the horizontal axis represents the wavelength (nm). Furthermore, in FIG. 12, the curve $L_B$ indicates the transmittance curve of filter B, the curve $L_{G1}$ indicates the transmission curve of filter G, the curve $L_{R1}$ indicates the transmission curve of filter $R_1$, and the curve $L_{R2}$ indicates the transmission curve of the filter $R_2$. Further, in the following, the visible region ranges from 400 nm to 700 nm, and the near-infrared region ranges from 700 nm to 1000 nm.

The filter $R_1$ and the filter $R_2$ have a region where the difference between transmittances, $D_{11}$, and the difference between transmittances, $D_{12}$, are each constant in each of the first visible light region and the near-infrared region, and have different transmittances in at least one of the first visible light region and the near-infrared region. Specifically, the filter $R_1$ and the filter $R_2$ have a region where the difference between transmittances, $D_{11}$, and the difference between transmittances, $D_{12}$, are each constant in each of the first visible light region and the near-infrared region, and have different transmittances in at least one of the first visible light region and the near-infrared region.

Even when the color filter 222A configured in this way is disposed on the light receiving face of the pixel unit 221, it is possible to simultaneously capture a visible light image and a near-infrared image as in the first embodiment described above.

In addition, in the first modification of the above-described first embodiment, the R filters that transmit light in the red wavelength band have different transmittances, but in addition to the $R_1$ filter and the $R_2$ filter, for example, the $G_1$ filter and the $G_2$ filter of the first embodiment described above may be used to constitute the color filter.

Second Modification of First Embodiment

Next, a second modification of the first embodiment will be described. In the first embodiment described above, each filter is disposed for each column, but this is not limited and can be changed as appropriate.

Figure 13:
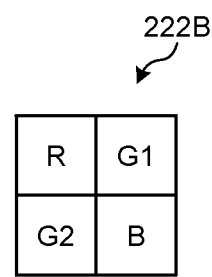
FIG. 13 is a diagram schematically illustrating a color filter of a second modification of the first embodiment.

FIG. 13 is a diagram schematically illustrating the color filter of the second modification of the first embodiment. A color filter 222B illustrated in FIG. 13 is configured in a Bayer array, and the $G_1$ filter and the $G_2$ filter are disposed at the locations where the G filters are disposed.

According to the second modification of the first embodiment described above, a conventional image processing pipeline (image signal line) can be used, so that a visible light image and a near-infrared image can be acquired at the same time with a simple configuration.

Second Embodiment

Next, a second embodiment will be described. In the second embodiment, the signal values of the R pixel and the B pixel that do not include the near-infrared are calculated. In the following, the calculation method calculated by the separation unit 32 will be described. The same components as those of the imaging device 1 according to the first embodiment described above are given the same reference numerals, and detailed description thereof will be omitted.

Figure 14:
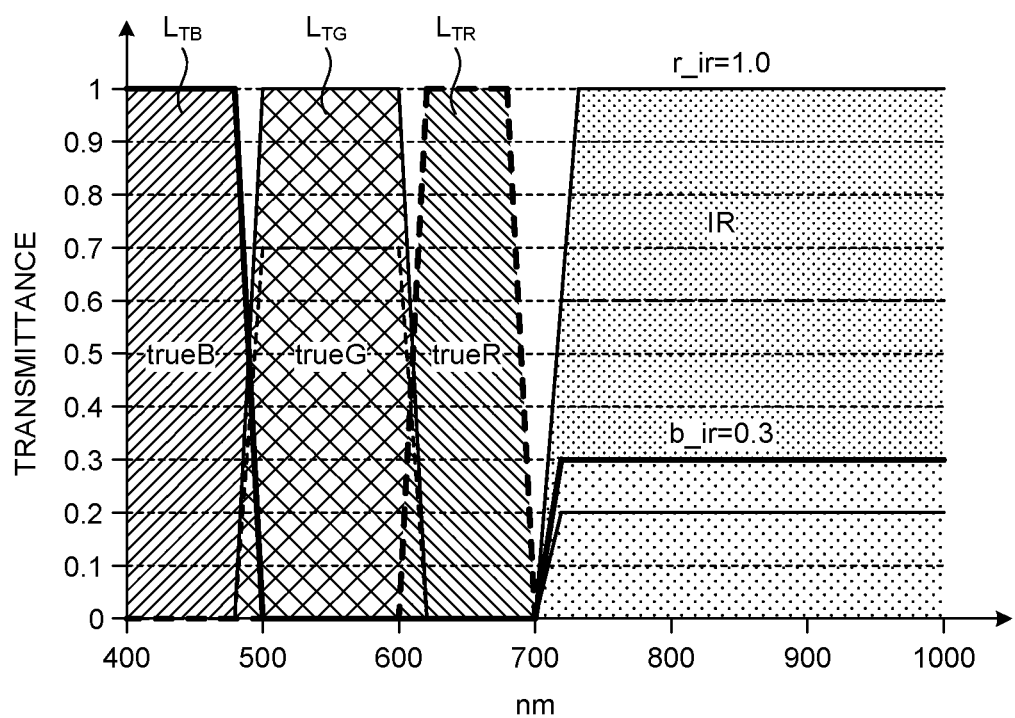
FIG. 14 is a diagram schematically illustrating the spectral transmittance of each wavelength band according to a second embodiment.

FIG. 14 is a diagram schematically illustrating the spectral transmittance in each wavelength band. In FIG. 14, the region $L_{TB}$ indicates the integral value of the image signal trueB of the B filter, the region $L_{TR}$ indicates the integral value of the image signal trueR of the R filter, the region $L_{TG}$ indicates the integral value of the image signal trueG when the $G_1$ filter+the $G_2$ filter are combined, and the $L_{TIR}$ indicates the integral value of the image signal IR. Furthermore, in FIG. 14, the vertical axis represents the transmittance and the horizontal axis represents the wavelength (nm).

As illustrated in FIG. 14, first, the separation unit 32 calculates the image signal trueG and the image signal IR by the method of the first embodiment described above. Then, as illustrated in FIG. 14, since the transmittance in the near-infrared region is substantially constant, the separation unit 32 calculates the image signal of the R pixel and the image signal of the B pixel based on the image signal IR of the near-infrared light. Specifically, the following equations hold when the transmittance in the near-infrared region is almost constant.

$$\text{true}R + r\_ir \times IR = \text{true}R + 1.0 \times IR = R \quad (7)$$

$$\text{true}B + b\_ir \times IR = \text{true}B + 0.3 \times IR = B \quad (8)$$

that is, $$\text{true}R = R - r\_ir \times IR = R - 1.0 \times IR \quad (9)$$

$$\text{true}B = B - b\_ir \times IR = B - 0.3 \times IR \quad (10)$$

In this way, the separation unit 32 calculates the image signal of each of the R pixel and the B pixel using the above equations (9) and (10).

According to the second embodiment described above, the true pixel values of the R pixel and the B pixel can be output.

Third Embodiment

Next, a third embodiment will be described. The third embodiment has a different configuration from the imaging device 1 according to the first embodiment described above. Specifically, the imaging device according to the third embodiment further includes a notch filter that cuts light in a predetermined wavelength band. Hereinafter, the configuration of the imaging device according to the third embodiment will be described. The same components as those of the imaging device 1 according to the first embodiment described above are given the same reference numerals, and detailed description thereof will be omitted.

Configuration of Imaging Device

Figure 15:
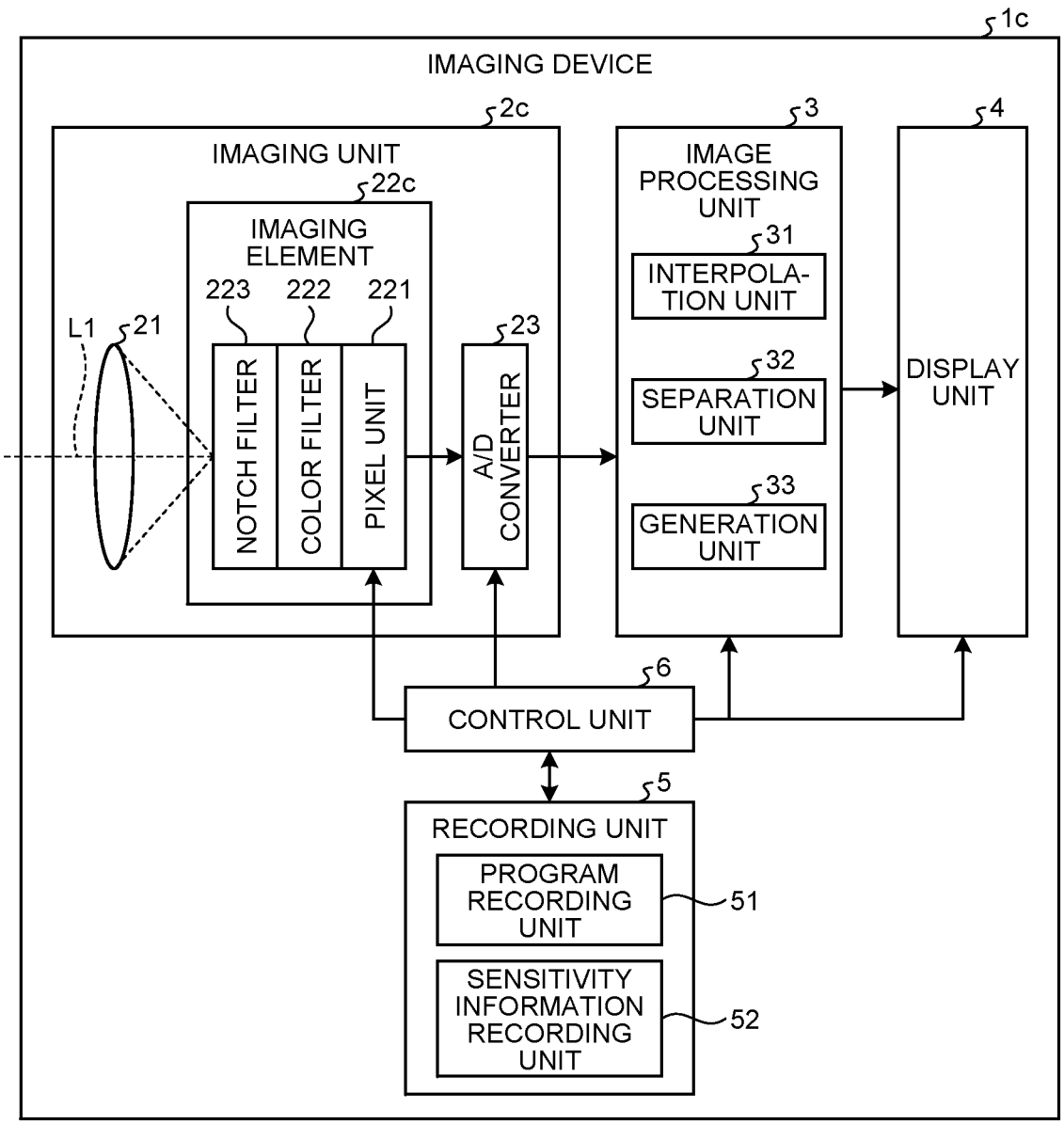
FIG. 15 is a block diagram illustrating a functional configuration of an imaging device according to a third embodiment.

FIG. 15 is a block diagram illustrating a functional configuration of the imaging device according to the third embodiment. An imaging device 10 illustrated in FIG. 15 includes an imaging unit 2C instead of the imaging unit 2 according to the first embodiment described above. Further, the imaging unit 2C includes an imaging element 22C instead of the imaging element 22 according to the first embodiment described above. The imaging element 22C further includes a notch filter 223 in addition to the configuration of the imaging element 22 according to the first embodiment described above.

The notch filter 223 transmits light in the visible region and cuts part of light in the near-infrared region.

Figure 16:
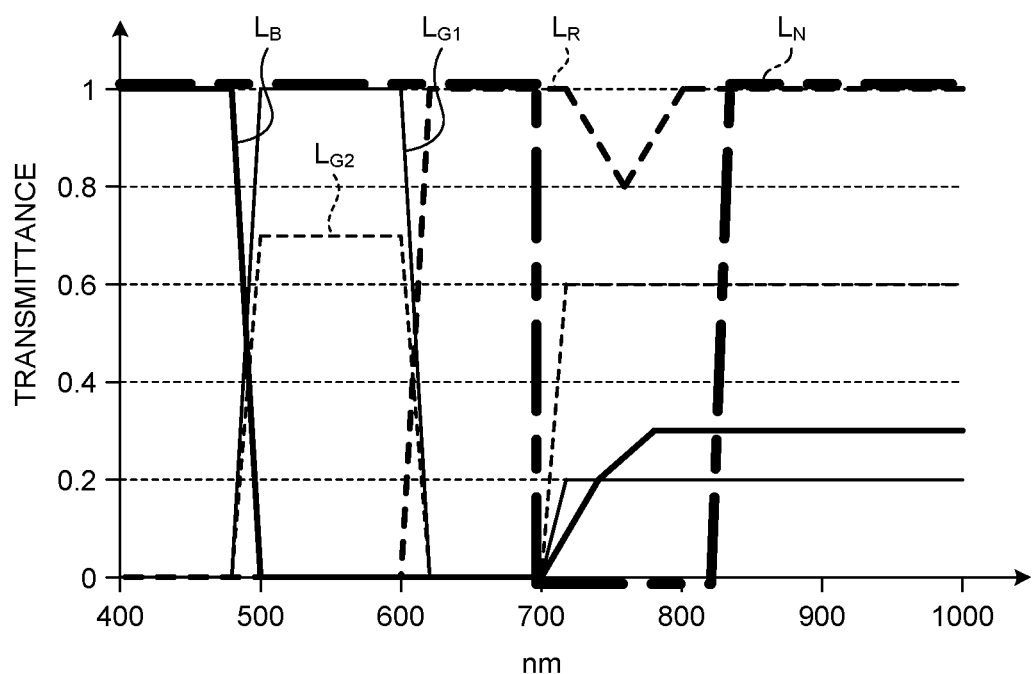
FIG. 16 is a diagram illustrating the transmission characteristics of each filter and a notch filter according to the third embodiment.

FIG. 16 is a diagram illustrating the transmission characteristics of each filter and the notch filter. In FIG. 16, the curve $L_N$ indicates the transmission characteristics of the notch filter 223. Further, in FIG. 16, the vertical axis represents the transmittance and the horizontal axis represents the wavelength (nm).

As illustrated in FIG. 16, the notch filter 223 transmits light in the visible region and cuts part of light in the near-infrared region. The notch filter 223 cuts light in a certain region in the near-infrared region, for example, in the region of 700 nm to 800 nm. As a result, the spectral transmittance of each filter is made substantially constant. As a result, a highly accurate near-infrared image can be acquired.

According to the third embodiment described above, since the notch filter 223 cuts light in a certain region in the near-infrared region, the spectral transmittance of each filter can be made almost constant, so that highly accurate near-infrared images can be acquired.

OTHER EMBODIMENTS

Various embodiments can be formed by appropriately combining the plurality of components disclosed in the above-described first to third embodiments of the present disclosure. For example, some components may be deleted from all the components described in the above-described first to third embodiments of the present disclosure. Further, the components described in the above-described first to third embodiments of the present disclosure may be appropriately combined.

Further, the first to third embodiments of the present disclosure are applied to the imaging device, but they may be applied, for example, to an endoscope system or a video microscope for capturing a subject, a mobile phone having an imaging function, and a tablet terminal having an imaging function.

Further, in the first to third embodiments of the present disclosure, the above-mentioned "unit" can be read as "means" or "circuit". For example, the control unit can be read as a control means or a control circuit.

According to the present disclosure, there is an effect that a color image and a near-infrared image can be acquired at the same time without providing an IR filter.

Additional advantages and modifications will readily occur to those skilled in the art. Therefore, the disclosure in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An imaging device comprising:
an imaging element including
a pixel portion in which a plurality of pixels are disposed in a two-dimensional matrix, each pixel being configured to generate an image signal by receiving light, and
a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region; and
a processor comprising hardware, the processor being configured to separate an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

2. The imaging device according to claim 1, wherein the color filter is in a Bayer array, and
the first same-color filter and the second same-color filter transmit light in a green wavelength band.

3. The imaging device according to claim 2, further comprising:
a notch filter provided on a light receiving face of the color filter and cutting part of light in the near-infrared region.

4. An imaging method performed by an imaging device, the imaging device including an imaging element and a processor comprising hardware, the imaging element including a pixel portion in which a plurality of pixels are disposed in a two-dimensional matrix, each pixel being configured to generate an image signal by receiving light, and a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region, the method comprising:
separating, by the processor, an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

5. A non-transitory computer-readable recording medium with an executable program stored thereon, the program being executed by an imaging device including an imaging element and a processor comprising hardware, the imaging element including a pixel portion in which a plurality of pixels are disposed in a two-dimensional matrix, each pixel being configured to generate an image signal by receiving light, and a color filter including a plurality of filters that have different spectral transmission characteristics in each of a visible region and a near-infrared region and that are disposed on the plurality of pixels, each filter corresponding to each pixel, any one or more of the plurality of filters being configured to transmit light in the near-infrared region, the plurality of filters including a first same-color filter and a second same-color filter which have different transmission wavelength characteristics in a same color wavelength band, have a region with a constant spectral transmittance in each of the visible region and the near-infrared region, and have different spectral transmittances in at least one of the visible region and the near-infrared region, the program causing the imaging device to execute:
separating, by the processor, an image signal in the visible region and an image signal in the near-infrared region from each of a first image signal and a second image signal based on a first ratio between a transmittance of the first same-color filter and a transmittance of the second same-color filter in the visible region and a second ratio between a transmittance of the first same-color filter and a transmittance of the second same-color filter in the near-infrared region, the first image signal being generated by the pixel on which the first same-color filter is disposed, the second image signal being generated by the pixel on which the second same-color filter is disposed.

* * * * *